US006469127B1

(12) United States Patent
Furunaga et al.

(10) Patent No.: US 6,469,127 B1
(45) Date of Patent: Oct. 22, 2002

(54) POLYCARBONATE RESIN HAVING LOW TENDENCY OF RELEASING ENVIRONMENTAL ENDOCRINE DISRUPTORS

(75) Inventors: Toshikatsu Furunaga; Tadasu Sato, both of Tokyo (JP)

(73) Assignee: Space Environmental Technology Company, Inc,, Tokyo (JP)

( * ) Notice: Subject to any disclaimer, the term of this patent is extended or adjusted under 35 U.S.C. 154(b) by 0 days.

(21) Appl. No.: 09/889,045

(22) PCT Filed: Jan. 12, 2000

(86) PCT No.: PCT/JP00/00093

§ 371 (c)(1),
(2), (4) Date: Jul. 11, 2001

(87) PCT Pub. No.: WO00/42088

PCT Pub. Date: Jul. 20, 2000

(30) Foreign Application Priority Data

Jan. 12, 1999 (JP) ............................................ 11-005759

(51) Int. Cl.[7] ............................................... C08G 64/00
(52) U.S. Cl. ........................................ 528/196; 528/198
(58) Field of Search ................................. 528/196, 198; 428/412, 64

(56) References Cited

FOREIGN PATENT DOCUMENTS

| JP | 5-155998 | | 6/1993 | |
|---|---|---|---|---|
| JP | 5155998 | * | 6/1993 | |
| JP | 6-3838 | | 1/1994 | ............ G03G/5/05 |
| JP | 6-25398 | | 2/1994 | ........... C08G/64/06 |
| JP | 6-49195 | | 2/1994 | ........... C08G/64/04 |
| JP | 6-145317 | | 5/1994 | ........... C08G/63/64 |
| JP | 6-216078 | | 8/1994 | ......... H01L/21/302 |
| JP | 6-322094 | | 11/1994 | ........... C08G/64/14 |
| JP | 8-134198 | | 5/1996 | ........... C08G/64/06 |
| JP | 8-134199 | | 5/1996 | ........... C08G/64/06 |
| JP | 9-71716 | | 3/1997 | |
| JP | 9-241363 | | 9/1997 | |

* cited by examiner

Primary Examiner—Terressa M. Boykin
(74) Attorney, Agent, or Firm—Sughrue Mion, PLLC

(57) ABSTRACT

A polycarbonate resin reduced in the release of environmental hormones which comprises structural units represented by general formula (A) and structural units represented by general formula (B), the structural units represented by general formula (A) accounting for 5 to 90 mol % of all the structural units, and which has an intrinsic viscosity of 0.30 to 0.60 dl/g. The polycarbonate resin is produced through the copolymerization of a bispenol whose ability to link to estrogen acceptors is low with an aliphatic dihydroxy compound. The resin hence has the basic properties inherent in polycarbonates, i.e. mechanical strength and heat resistance, and is reduced in the release of environmental hormones.

4 Claims, 1 Drawing Sheet

POLYCARBONATE RESIN HAVING LOW TENDENCY OF RELEASING ENVIRONMENTAL ENDOCRINE DISRUPTORS

TECHNICAL FIELD

The present invention relates to a polycarbonate resin having excellent moldability and low tendency of releasing environmental endocrine disruptors, which can be suitably used for applications such as packages for medical products and foods coming into direct contact with the human body and fluid, and for applications such as optical disks and lenses of spectacles coming into frequent contact with the human body in daily life.

PRIOR ART

Polycarbonate resins (bisphenol A polycarbonates) obtained by causing carbonate precursors to react with 2,2-bis(4-hydroxyphenyl)propane are excellent in transparency, heat resistance, mechanical characteristics and dimensional stability, finding wide applications as engineering plastics. Beside the bisphenol A polycarbonates, polycarbonate resins having various bisphenol skeletons have recently been proposed and applied to electrophotographic photosensitive materials, optical disks, heat-resistant films, polarizing films, tableware, etc.

It has recently been revealed that the polycarbonate resins thus used in every life tend to be gradually hydrolyzed to release bisphenols which are their constituents, when repeatedly placed under the conditions of high temperatures and humidity, and that free bisphenols act as pseudo-hormones of estrogens, female hormones, to link to receptors. The structural formula of estradiol, one of estrogens, and the structural formulas of compounds acting as the pseudo-hormones of estrogens to link to the receptors are shown below:

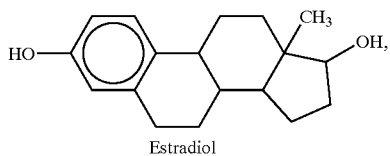
Estradiol
Pseudo-hormones

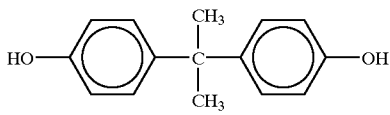
Bisphenol A

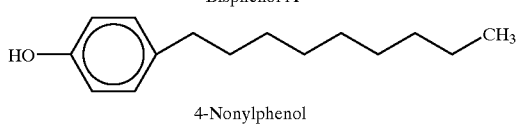
4-Nonylphenol

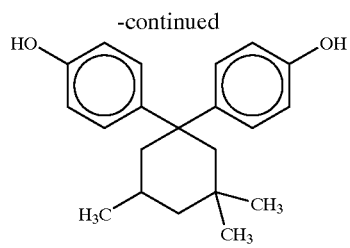
3,3,5-Trimethyl-1,1-bis(4-hydroxyphenyl)cyclohexane.

It is known that the bisphenols tend to show a weak function as an estrogen to link to estrogen receptors. Accordingly, it may be considered undesirable to use the bisphenols likely to link to the estrogen receptors for products frequently coming into contact with the human body, though their mechanism has not been fully found.

The inventors have evaluated the properties of various bisphenols as environmental endocrine disruptors to provide polycarbonate resins having low tendency of releasing environmental endocrine disruptors. As a result, it has been discovered that extremely harmless in terms of the environmental endocrine disruptors is a bisphenol having a fluorene skeleton represented by the following general formula (I):

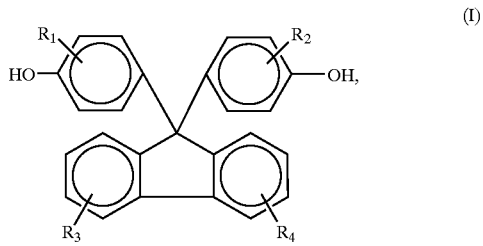

wherein each of $R_1$ to $R_4$ is a hydrogen atom, a fluorine, chlorine or bromine atom, or an alkyl group having 1 to 5 carbon atoms, an aryl group having 6 to 12 carbon atoms, an alkenyl group having 2 to 5 carbon atoms, an alkoxyl group having 1 to 5 carbon atoms or an aralkyl group having 7 to 17 carbon atoms, each of which may have a substituent group bonded to a carbon atom therein, the substituent group being an alkyl or alkenyl group having 1 to 5 carbon atoms, an alkoxyl group having 1 to 5 carbon atoms, a halogen atom selected from the group consisting of the group consisting of fluorine, chlorine and bromine, or a dimethyl polysiloxy group.

The comparison in $IC_{50}$ of 9,9-bis(3-methyl-4-hydroxyphenyl)fluorene, one of the bisphenols represented by the general formula (I), with other bisphenols is shown in Table 1. $IC_{50}$ is defined as the concentration of an imitation required to substitute 50% of a genuine hormone linked to a receptor, and the smaller the numerical value of $IC_{50}$, the higher affinity for a receptor, meaning a higher tendency of releasing an environmental endocrine disruptor.

TABLE 1

| Tendency to Link to Estrogen Receptor | | |
|---|---|---|
| Sample Evaluated | Applied for | $IC_{50}$ ($\mu M$) |
| Estradiol | Internal hormones | 0.013 |
| Diethylstilbestrol | Pharmaceuticals | 0.011 |

TABLE 1-continued

Tendency to Link to Estrogen Receptor

| Sample Evaluated | Applied for | IC$_{50}$ ($\mu$M) |
| --- | --- | --- |
| Bisphenol A | Industrial products | 32 |
| 4-Nonylphenol | Industrial products | 3.9 |
| 3,3,5-Trimethyl-1,1-bis(4-hydroxyphenyl)-cyclohexane | Industrial products | 1> |
| 9,9-Bis(3-methyl-4-hydroxyphenyl)fluorene* | Industrial products | >100 |

Note:
*9,9-bis(3-methyl-4-hydroxyphenyl)fluorene.

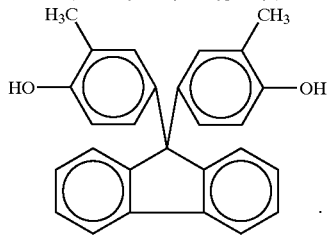

The above table has revealed that the bisphenols having fluorene skeletons are higher in IC$_{50}$ than the other bisphenols, and that they are thus highly safe compounds for humans. The polycarbonate resins having fluorene skeletons have conventionally been used for applications utilizing their optical characteristics, such as optical recording media, polarizing films, liquid crystal panels and lens. Please see Japanese Patent Laid-Open Nos. 6-145317 (1994), 6-25398 (1994), 6-216078 (1994), 6-322094 (1994) and 8-134199 (1996). Their applications for electrophotographic photosensitive materials and cast films are described in Japanese Patent Laid-Open Nos. 6-3838 (1994) and 8-134198 (1996). Further, their applications for high heat-resistant tableware usable in microwave ovens are described in Japanese Patent Laid-Open No. 6-49195 (1994), etc.

Because the polycarbonate resins having fluorene skeletons have rigid structures, it is necessary to introduce soft segments for improving their moldability. However, all of the conventional fluorene polycarbonate resins have soft segments into which constituent units such as bisphenol A having high tendency of releasing environmental endocrine disruptors are introduced. Accordingly, although the conventional fluorene polycarbonate resins contain highly safe bisphenols having the fluorene skeletons, consideration has not been sufficient on safety to humans.

OBJECT OF THE INVENTION

It is therefore an object of the present invention to provide a polycarbonate resin exerting little influence as a environmental endocrine disrupter on the human body, even when a bisphenol or other constituent components are released therefrom by undergoing sever thermal history under the conditions of high temperature and humidity or by recycling, and excellent in moldability.

SUMMARY OF THE INVENTION

As a result of intensive investigation in view of the above object, it has been discovered that a bisphenol having a fluorene skeleton exhibits a low tendency to link to an estrogen receptor, and that by combining such a bisphenol with an aliphatic dihydroxy compound less likely to link to an estrogen receptor as a soft segment, it is possible to provide a physiologically extremely safe polycarbonate resin without impairing its properties as a polycarbonate. The present invention has been completed based on this finding.

Thus, the polycarbonate resin of the present invention comprises only constituent units derived from compounds having low tendency of releasing environmental endocrine disruptors, thereby exhibiting high safety to the human body.

In the present invention, a polycarbonate resin having useful properties can be obtained by adjusting the amount of a fluorene skeleton-containing bisphenol unit to 5 to 90 mol % based on the total constituent units.

DESCRIPTION OF THE PREFERRED EMBODIMENTS

[1] Raw Materials for Polycarbonate Resin

Figure 1:
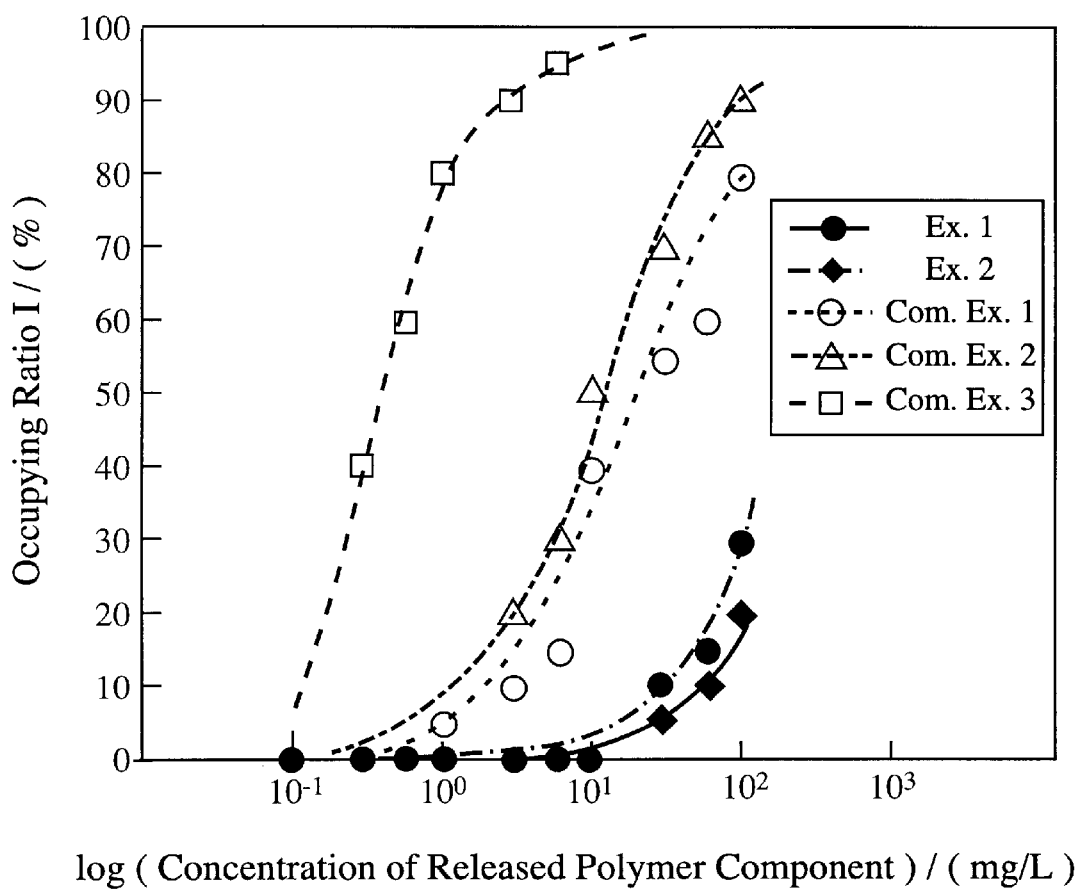
FIG. 1 is a graph showing the relationship between the concentrations of components released from polymers of EXAMPLES 1 and 2 and COMPARATIVE EXAMPLES 1 to 3, and an occupying ratio of the components released from the polymers in an estrogen receptor.

The polycarbonate resin of the present invention is obtained by copolymerizing (a) a bisphenol having a fluorene skeleton and (b) an aliphatic dihydroxy compound. Compounds constituting the repeating units of the polycarbonate resin of the present invention are described in detail below.

(a) Bisphenol Having Fluorene Skeleton

The bisphenol having a fluorene skeleton for constituting a hard segment of the polycarbonate resin of the present invention is represented by the following general formula (I):

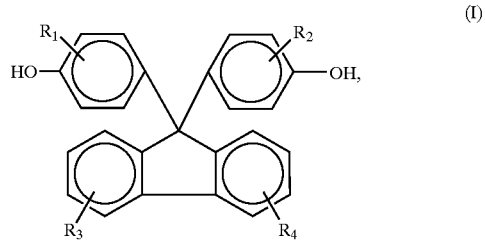

wherein each of $R_1$ to $R_4$ is a hydrogen atom, a fluorine, chlorine or bromine atom, or an alkyl group having 1 to 5 carbon atoms, an aryl group having 6 to 12 carbon atoms, an alkenyl group having 2 to 5 carbon atoms, an alkoxyl group having 1 to 5 carbon atoms or an aralkyl group having 7 to 17 carbon atoms, each of which may have a substituent group bonded to a carbon atom therein, the substituent group being an alkyl or alkenyl group having 1 to 5 carbon atoms, an alkoxyl group having 1 to 5 carbon atoms, a halogen atom selected from the group consisting of fluorine, chlorine and bromine, or a dimethyl polysiloxy group.

Specific examples of the bisphenols represented by the above general formula (I) include the following compounds:

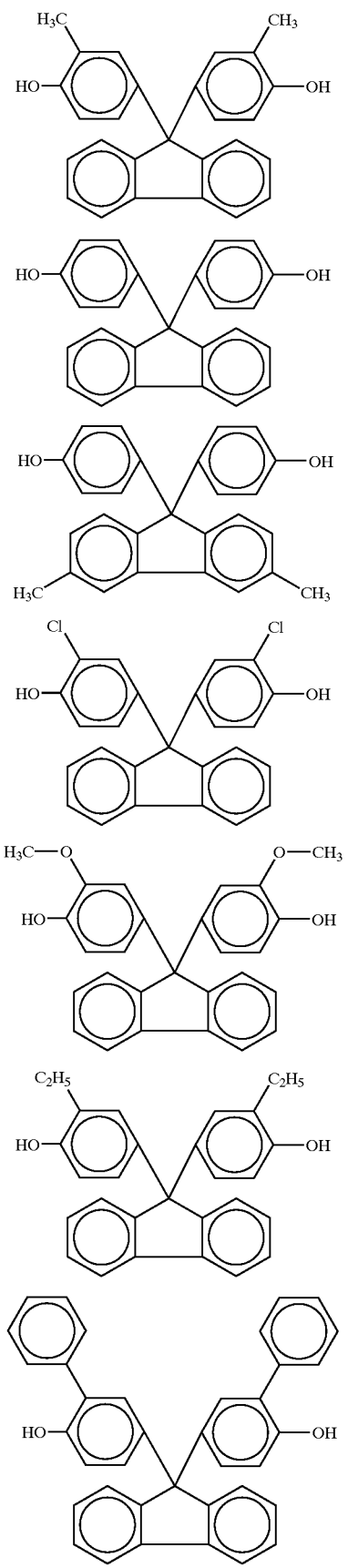
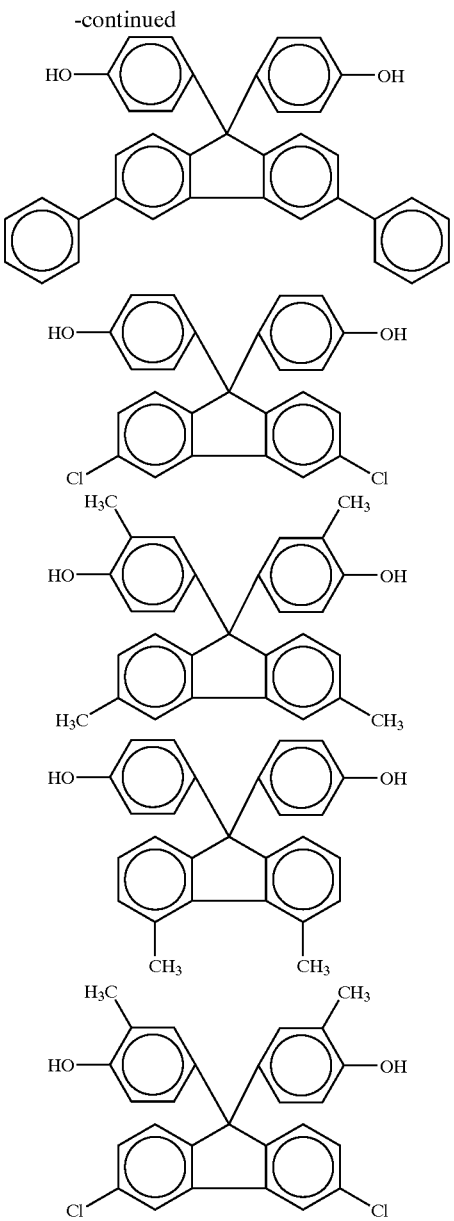

Preferable [among these compounds are 9,9-bis(4-hydroxyphenyl)fluorene, 9,9-bis(3-methyl-4-hydroxyphenyl)fluorene, 3,6-dimethyl-9,9-bis(4-hydroxy phenyl)-fluorene, and particularly preferable is 9,9-bis(3-methyl-4-hydroxy]phenyl)fluorene.

Thought the reason why the bisphenols having such a structure exhibit little tendency to link to the estrogen receptors is not clear, it may be considered that these molecules have such reduced degree of freedom due to the existence of the fluorene skeletons that they cannot take a conformation permitting link to the estrogen receptors.

In the polycarbonate resin of the present invention, the bisphenol having a fluorene skeleton represented by the general formula (I) may be used alone or in combination. The percentage of the bisphenol having a fluorene skeleton represented by the general formula (I) is preferably from 5 to 90 mol %, more preferably from 20 to 80 mol %.

(b) Aliphatic Dihydroxy Compound

The aliphatic dihydroxy compound constituting a soft segment of the polycarbonate resin of the present invention may be represented by the following general formula (II):

HO—R$_5$—OH  (II)

wherein R$_5$ is an alkyl group having 2 to 20 carbon atoms, or an oxyalkyl group having 2 to 20 carbon atoms, each of which may have a substituent group bonded to a carbon atom therein, the substituent group being an alkyl or alkenyl group having 1 to 5 carbon atoms, an alkoxyl group having 1 to 5 carbon atoms, a halogen atom selected from the group consisting of fluorine, chlorine and bromine, or a dimethyl polysiloxy group.

Particularly preferred examples thereof include:

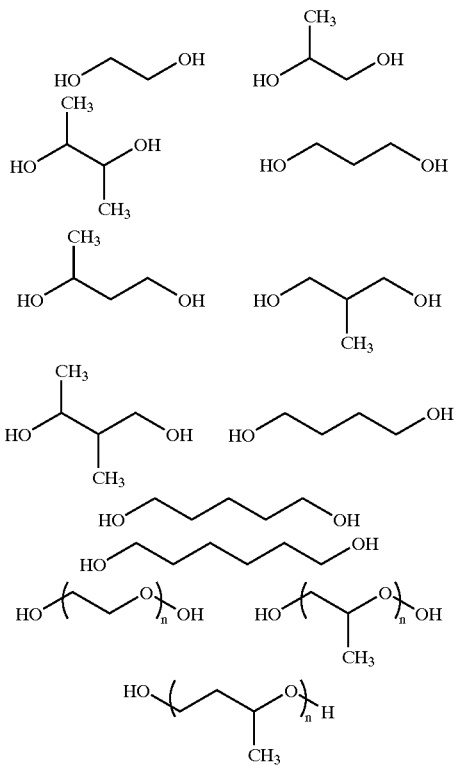

n=1-200.

In the polycarbonate resin of the present invention, the aliphatic dihydroxy compounds represented by the general formula (II) may be used alone or in combination.

[2] Production of Polycarbonate Resin

The polycarbonate resin of the present invention can be synthesized by a known melt polymerization process. Specifically, using a carbonic diester as a carbon source, the bisphenol having a fluorene skeleton represented by the general formula (I) is polycondensed with the aliphatic dihydroxy compound represented by the general formula (II) in a molten state by an ester exchange reaction, to synthesize the polycarbonate resin of the present invention.

Usable as the carbonic diester are diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate or the like. Particularly preferred examples among them include diphenyl carbonate and dibutyl carbonate.

The carbonic diester is preferably used in an amount of 1.0 to 1.1 mol, based on the total amount (1 mol) of the compound represented by the general formula (I) and the compound represented by the general formula (II).

A basic compound is used as a catalyst for the ester exchange reaction. Such basic compounds preferably used include alkali metal compounds, alkaline earth metal compounds, quaternary ammonium hydroxides and salts thereof, and amines.

The polymerization reaction is allowed to proceed by placing the compounds represented by the general formula (I) and (II) as raw materials, and the carbonic diester such as diphenyl carbonate in a reactor, adding the catalyst thereto, and then heating them to remove by-products by an ester exchange reaction under normal or reduced pressure. The reaction may be conducted by a single- or multiple-stage polymerization, and a batch system or a continuous system can be employed for each reaction.

The reaction is conducted at a temperature of 120 to 320° C., preferably 180 to 300° C. The reaction usually starts under normal pressure, and the reaction pressure is gradually decreased as the reaction proceeds, with polycondensation finished at a pressure of 1 mmHg or less and the remaining monomers removed.

A catalyst-deactivating agent may be added at the end of the reaction. Usable as the catalyst-deactivating agent are aromatic sulfonic acids such as p-toluenesulfonic acid, aromatic sulfonic acid esters, or organic halides such as stearoyl chloride, butyroyl chloride, benzoyl chloride or toluenesulfonyl chloride.

In the present invention, antioxidants, pigments, dyes, reinforcing agents or fillers, ultraviolet absorbers, lubricants, crystalline nucleating agents, antistatic agents, plasticizers, fluidity improvers, molecular weight modifiers and branching agents may further be added. Polymer alloys can be produced by blending the polycarbonate resin of the present invention with conventional polycarbonate resins. However, these additives and other blending materials are preferably substances having low or no tendency of releasing environmental endocrine disruptors.

[3] Polycarbonate Resin

By the above polymerization process, the compound represented by the general formula (I) constitutes a hard segment represented by the following general formula (A), which is rigid and has a high glass transition temperature,

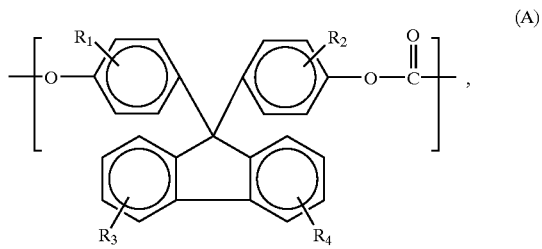

wherein each of R$_1$ to R$_4$ is a hydrogen atom, a fluorine, chlorine or bromine atom, or an alkyl group having 1 to 5 carbon atoms, an aryl group having 6 to 12 carbon atoms, an alkenyl group having 2 to 5 carbon atoms, an alkoxyl group having 1 to 5 carbon atoms or an aralkyl group having 7 to 17 carbon atoms, each of which may have a substituent group bonded to a carbon atom therein, the substituent group being an alkyl or alkenyl group having 1 to 5 carbon atoms, an alkoxyl group having 1 to 5 carbon atoms, a halogen atom selected from the group consisting of fluorine, chlorine and bromine, or a dimethyl polysiloxy group; and [the compound represented by the general formula (II) constitutes a soft segment represented by the following general formula (B), which is soft and has a low glass transition temperature,]

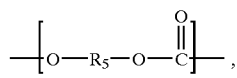

wherein $R_5$ is an alkyl group having 2 to 20 carbon atoms, or an oxyalkyl group having 2 to 20 carbon atoms, each of which may have a substituent group bonded to a carbon atom therein, the substituent group being an alkyl or alkenyl group having 1 to 5 carbon atoms, an alkoxyl group having 1 to 5 carbon atoms, a halogen atom selected from the group consisting of fluorine, chlorine and bromine, or a dimethyl polysiloxy group.

Accordingly, the proportions of both components may be arbitrarily combined to form the polycarbonate resin having desired heat resistance and mechanical characteristics. The amount of the constituent unit represented by the general formula (A) is from 5 to 90 mol % based on the total constituent units. When the amount of the constituent unit represented by the general formula (A) is less than 5 mol %, the heat resistance and transparency are undesirably low. On the other hand, exceeding 90 mol % undesirably results in poor moldability. Practically, the amount of the constituent unit (A) is more preferably 20 to 80 mol %.

Further, the polycarbonate resin of the present invention preferably has a molecular weight; Mn=5,000 to 35,000 and Mw=10,000 to 45,000, and more preferably Mn=5,000 to 18,000 and Mw=15,000 to 30,000.

The polycarbonate resin of the present invention can be molded by known methods such as extrusion molding, injection molding, blow molding, compression molding and wet molding. To carry out these molding methods easily, the polycarbonate resin preferably has an intrinsic viscosity in a range of 0.30 to 0.60 dl/g.

The present invention will be described with reference to the following examples in more detail, without intention of restricting the scope of the present invention thereto.

EXAMPLE 1

210 g (0.60 mol) of 9,9-bis(4-hydroxyphenyl)fluorene represented by the following formula,

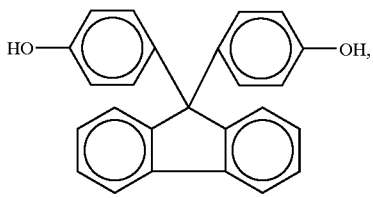

36 g (0.40 mol) of 1,4-butanediol, 225 g (1.05 mol) of diphenyl carbonate, and $1.0 \times 10^{-7}$ mol of sodium hydrogen carbonate were introduced into a 1-liter, four-necked flask equipped with a stirrer and a distiller, heated at 180° C. in an atmosphere of nitrogen, and stirred for 30 minutes to melt them completely.

The pressure was then reduced to 150 mmHg, while the temperature was elevated to 240° C. at a rate of 60° C./hr. This condition was maintained for 40 minutes to conduct an ester exchange reaction. With pressure reduced to 1 mmHg or less, the reaction was continued at 280° C. for 2 hours. After the reaction was completed, nitrogen was blown into the flask so that the inside thereof returned to normal pressure, and a polycarbonate resin produced was taken out.

As a result of measurement in methylene chloride at 20° C., the intrinsic viscosity of the resultant polycarbonate resin was 0.43 dl/g. After cooled, the polycarbonate resin was transparent, having a glass transition temperature of 99.4° C.

EXAMPLE 2

226.8 g (0.60 mol) of 9,9-bis(3-methyl-4-hydroxyphenyl) fluorene represented by the following formula:

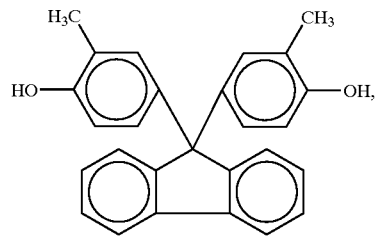

36 g (0.40 mol) of 1,4-butanediol, 225 g (1.05 mol) of diphenyl carbonate and $1.0 \times 10^{-7}$ mol of sodium hydrogen carbonate were introduced into a 1-liter, four-necked flask equipped with a stirrer and a distiller, heated at 200° C. in an atmosphere of nitrogen, and stirred for 40 minutes to melt them completely.

The pressure was then reduced to 150 mmHg, with the temperature elevated to 260° C. at a rate of 60° C./hr. This condition was maintained for 120 minutes to conduct an ester exchange reaction. The pressure was then reduced to 1 mmHg or less, and the reaction was continued at 280° C. for 2 hours. After the reaction was completed, nitrogen was blown into the flask so that the inside thereof returned to normal pressure, and a polycarbonate resin produced was taken out.

As a result of measurement in methylene chloride at 20° C., the intrinsic viscosity of this polycarbonate resin was 0.51 dl/g. After cooled, the polycarbonate resin was transparent, having a glass transition temperature of 106.5° C.

Comparative Example 1

226.8 g (0.60 mol) of 9,9-bis(3-methyl-4-hydroxyphenyl) fluorene, 91.2 g (0.40 mol) of bisphenol, 225 g (1.05 mol) of diphenyl carbonate and $1.0 \times 10^{-7}$ mol of sodium hydrogen carbonate were introduced into a 1-liter, four-necked flask equipped with a stirrer and a distiller, heated at 180° C. in an atmosphere of nitrogen, and stirred for 40 minutes to melt them completely.

The pressure was then reduced to 1 mmHg, with the temperature elevated to 240° C. at a rate of 60° C./hr. This condition was maintained for 40 minutes to conduct an ester exchange reaction. The pressure was then reduced to 1 mmHg or less, and the reaction was continued at 280° C. for 2 hours. After the reaction was completed, nitrogen was blown into the flask so that the inside thereof returned to normal pressure, and a polycarbonate resin produced was taken out.

As a result of measurement in methylene chloride at 20° C., the intrinsic viscosity of this polycarbonate resin was 0.53 dl/g. After cooled, the polycarbonate resin was transparent, having a glass transition temperature of 163° C.

Comparative Example 2

A polycarbonate resin of bisphenol A (trade name "LEXAN 121," available from GE Plastics) was used as COMPARATIVE EXAMPLE 2.

Comparative Example 3

A polycarbonate resin of 3,3,5-trimethyl- 1,1-bis(4-hydroxyphenyl)cyclohexane (Apec: trade name "Makrolon KU1-9371," available from Bayer) was used as COMPARATIVE EXAMPLE 3.

Evaluation of Function as Environmental Endocrine Disruptors

How much components released from the polycarbonate resins of EXAMPLES 1 and 2 and COMPARATIVE EXAMPLES 1 to 3 functioned as environmental endocrine disruptors was evaluated. The evaluation of the function as environmental endocrine disruptors was carried out by measuring the concentrations ($IC_{50}$) of components released from the polymers required to substitute 50% of tritium-labeled estradiol (hereinafter referred to as [3H]-estradiol) linked to an estrogen receptor with the nonradioactive component released from the polymer according to the following procedure.

(1) Preparation of Component Released from Polymer 10 g of the polycarbonate resin was freeze-crushed to an average particle size of 40 to 80 $\mu$m, and 100 ml of 2-M NaOH was added thereto, followed by hydrolysis for 8 hours. After cooling, the resulting product was neutralized with hydrochloric acid, and organic components were extracted with 50 ml of methylene chloride. Methylene chloride was then evaporated to dry a hydrolyzate, which was taken as components released from the polycarbonate resin.

(2) Production of Estrogen Receptor-Containing Membrane Preparation

An estrogen receptor-containing membrane preparation was produced according to a method described in Anderson J., Clark J. H. and Peck E. J. Jr. (1972). Oestrogen and nuclear binding sites. Determination of specific sites by (3H)oestradiol exchange. Biochem. J. 126, 561–7; Korach K. S. (1979). Estrogen action in the mouse uterus: characterization of the cytosol and nuclear receptor systems. Endocrinology 104, 1324–32. Several Reviews by Katenellenbogen; EDSTAC, Draft Report: Apr. 3, 1998. Appendix J and "Drug Receptors" p33–44 (edited by Kazunari Takayanagi, Nanzando). First, a mature female rat was killed to take out the uterus. A fat adhered to a uterine tissue was then removed. After measuring its weight, the tissue was placed in ice. The tissue was cut into small pieces up to 1 to 2 mm square, and introduced into a polytron homogenizer previously cooled in ice. Ice-cooled TEDG buffer (10 mM Tris·HCl (pH 7.6), 1.5 mM EDTA, 1 mM DTT, 10% glycerol) was added thereto in an amount of 1.0 ml per 50 mg of tissue, and the resulting mixture was homogenized for 5 seconds. The homogenate was introduced into a centrifugal tube previously cooled, and centrifuged at 105,000×g for 60 minutes to obtain a supernatant, which was taken as the receptor-containing membrane preparation.

(3) Saturation Binding Test Using Radioactive Ligand

The saturation binding test was conducted according to a method described in EDSTAC, Draft Report: Apr. 3, 1998. Appendix J and Shin-Seikagaku Jikken Koza (New Biochemical Experiment Course) 7, "Growth Differentiation Factors and Receptors Thereof", p. 203–211 (edited by Biochemical Society of Japan, Tokyo Kagaku Dojin). The concentration of [$^3$H]-estradiol was adjusted to 0.01 nM, 0.03 nM, 0.06 nM, 0.1 nM, 0.3 nM, 0.6 nM, 1 nM, 3 nM and 6 nM, respectively, and the total binding amount at each concentration and the nonspecific binding amount were measured at a time when a 1000-fold excess of nonradioactive estradiol in relation to each concentration was added, to calculate the specific binding amount at each concentration. By determination from the specific binding amount at each concentration, the dissociation constant $K_D$ of estradiol was 0.06 nM, and the maximum number of binding sites Bmax was 42 fmol/mg.

(4) Measurement of Affinity of Component Released from Polymer for Estrogen Receptor by substitution curve method As a result of the saturation binding test, [$^3$H]-estradiol having a final concentration of 3 nM was dissolved in a 0.5-% aqueous solution of dimethyl sulfoxide (DMSF) to yield concentrations of the component released from the polymer of 0 mg/L, 0.1 mg/L, 0.3 mg/L, 0.6 mg/L, 1.0 mg/L, 3.0 mg/L, 6.0 mg/L, 10 mg/L, 30 mg/L, 60 mg/L and 100 mg/L, respectively, and a reaction solution was prepared in 1-ml aliquots in glass tubes.

The reaction solution thus prepared was evaporated in a vacuum dryer to obtain a dry product, which was then placed in ice.

1 ml of the previously prepared supernatant of the homogenate containing the estrogen receptor was then added to each tube. After mild stirring, each tube was capped to carry out incubation at 4° C. for 20 hours. Each mixed solution was poured onto a filter fitted with a glass filter paper for suction filtration. The glass filter paper was then washed with an ice-cooled buffer [50 mM Tris·HCl (pH 7.6)]. After the filter paper was dried, the radioactivity was measured with a liquid scintillation counter.

The occupying ratio of the component released from the polymer linked to the estrogen receptor was calculated from each measured value of the radioactivity at a time when the sample to be tested (the component released from the polymer) of each concentration was added. Further, the concentration ($IC_{50}$) of the sample to be tested which substituted 50% of the specific binding of the radioactive ligand (3 nM [$^3$H]-estradiol) was determined by drawing the substitution curve.

The estrogen receptor occupying ratio and the $IC_{50}$ of the components released from the polymers thus determined are shown in Table 2.

TABLE 2

Occupying Ratios I (%) of Components Released from Polymers at Respective Concentrations of Released Components

| Concentration of Released Component | EXAMPLE 1 | EXAMPLE 2 | COM. EX. 1 | COM. EX. 2 | COM. EX. 3 |
|---|---|---|---|---|---|
| 0.1 mg/L | 0% | 0% | 0% | 0% | 0% |
| 0.3 mg/L | 0% | 0% | 0% | 0% | 40% |
| 0.6 mg/L | 0% | 0% | 0% | 0% | 60% |
| 1 mg/L | 0% | 0% | 5% | 5% | 80% |
| 3 mg/L | 0% | 0% | 10% | 20% | 90% |
| 6 mg/L | 0% | 0% | 15% | 30% | 95% |

TABLE 2-continued

Occupying Ratios I (%) of Components Released from Polymers at Respective Concentrations of Released Components

| Concentration of Released Component | EXAMPLE 1 | EXAMPLE 2 | COM. EX. 1 | COM. EX. 2 | COM. EX. 3 |
|---|---|---|---|---|---|
| 10 mg/L | 0% | 0% | 40% | 50% | — |
| 30 mg/L | 10% | 5% | 55% | 70% | — |
| 60 mg/L | 15% | 10% | 60% | 85% | — |
| 100 mg/L | 30% | 20% | 80% | 90% | — |
| $IC_{50}$ | >100 mg/L | >100 mg/L | 28 mg/L | 10 mg/L | 0.52 mg/L |

As is apparent from Table 2, the components released from the polycarbonate resins of EXAMPLES 1 and 2 exhibited very high $IC_{50}$. Accordingly, even when the components constituting the polycarbonates are released, there is a little danger that they link to the estrogen receptors. It has thus been confirmed that the polycarbonate resins of the present invention are highly safe resins for humans. Further, the intrinsic viscosity of the polycarbonate resins of EXAMPLES 1 and 2 was within the range of 0.30 to 0.60 dl/g, showing that they have as good moldability as the conventional products in addition to improved safety.

On the other hand, the polycarbonate resins of COMPARATIVE EXAMPLES 2 and 3 containing no bisphenols having fluorene skeletons at all exhibited very low $IC_{50}$. Further, although COMPARATIVE EXAMPLE 1 contained a bisphenol having a fluorene skeleton in its constituent components, it contained bisphenol A, showing considerably lower $IC_{50}$ value than those of EXAMPLES 1 and 2. The lower $IC_{50}$ means the higher tendency to link to estrogen receptors. It is therefore unfavorable to use such polycarbonate resins in products coming into contact with the human body directly or indirectly.

Because the polycarbonate resin of the present invention is formed by the copolymerization of the bisphenol having low tendency to link to estrogen receptors with the aliphatic dihydroxy compound, it has not only mechanical strength and heat resistance inherent in polycarbonates, but its hydrolyzate has low tendency to link to estrogen receptors. Accordingly, it can provide molding materials that are physiologically extremely safe not only in applications of coming into direct contact with the human body or fluid, but also in applications of coming into frequent contact with the human body in daily life.

What is claimed is:

1. A polycarbonate resin having low tendency of releasing an environmental endocrine disrupter, consisting essentially of a constituent unit represented by the following general formula (A):

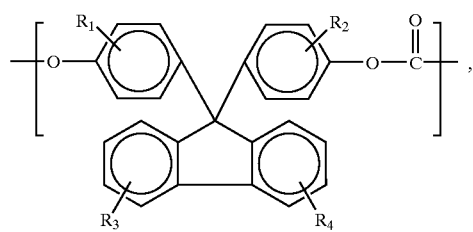

wherein each of $R_1$ to $R_4$ is a hydrogen atom, a fluorine, chlorine or bromine atom, or an alkyl group having 1 to 5 carbon atoms, an aryl group having 6 to 12 carbon atoms, an alkenyl group having 2 to 5 carbon atoms, an alkoxyl group having 1 to 5 carbon atoms or an aralkyl group having 7 to 17 carbon atoms, each of which may have a substituent group bonded to a carbon atom therein, said substituent group being an alkyl or alkenyl group having 1 to 5 carbon atoms, an alkoxyl group having 1 to 5 carbon atoms, a halogen atom selected from the group consisting of fluorine, chlorine and bromine, or a dimethyl polysiloxy group; and said constituent unit represented by the following general formula (B):

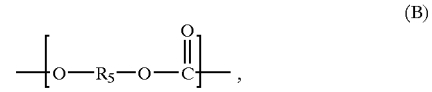

wherein, $R_5$ is an alkyl group having 2 to 20 carbon atoms, or an oxyalkyl group having 2 to 20 carbon atoms, each of which may have a substituent group bonded to a carbon atom therein, said substituent group being an alkyl or alkenyl group having 1 to 5 carbon atoms, an alkoxyl group having 1 to 5 carbon atoms, a halogen atom selected from the group consisting of fluorine, chlorine and bromine, or a dimethyl polysiloxy group, the amount of said constituent unit represented by the general formula (A) being 5 to 90 mol % based on the total constituent units, and said polycarbonate resin having an intrinsic viscosity of 0.30 to 0.60 dl/g measured at 20° C. in methylene chloride.

2. The polycarbonate resin having a low tendency of releasing an environmental endocrine disruptor according to claim 1, wherein said constituent unit represented by the general formula (A) is derived from at least one selected from the group consisting of 9,9-bis(4-hydroxyphenyl)fluorene, 9,9-bis(3-methyl-4-hydroxyphenyl)fluorene and 3,6-dimethyl-9,9-bis(4-hydroxyphenyl)fluorene.

3. The polycarbonate resin having low tendency of releasing an environmental endocrine disruptor according to claim 1, wherein said constituent unit represented by the general formula (B) is derived from at least one selected from the group consisting of ethylene glycol, 1,3-propanediol, 1,4-butanediol, 1,6-heptanediol, polyoxyethylene glycol, polyoxypropylene glycol and polyoxybutylene glycol.

4. The polycarbonate resin having low tendency of releasing an environmental endocrine disruptor according to claim 2, wherein said constituent unit represented by the general formula (B) is derived from at least one selected from the group consisting of ethylene glycol, 1,3-propanediol, 1,4-butanediol, 1,6-heptanediol, polyoxyethylene glycol, polyoxypropylene glycol and polyoxybutylene glycol.

* * * * *